March 15, 1932.   C. K. HUTHSING   1,849,089

METHOD OF FORMING JOINTS

Filed Dec. 9, 1929

Inventor
C. K. Huthsing
By E. E. Huffman
Atty.

Patented Mar. 15, 1932

1,849,089

UNITED STATES PATENT OFFICE

CHARLES K. HUTHSING, OF ST. LOUIS COUNTY, MISSOURI

METHOD OF FORMING JOINTS

Application filed December 9, 1929. Serial No. 412,663.

My invention relates to a method of forming joints in sheet metal and is particularly useful in the manufacture of containers, such for example as chemical fire extinguishers, which must be gas tight under high pressure.

Heretofore it has been customary to form the joints in fire extinguishers, for example, by first tinning the edges of the metal which are to form the overlapping layers of the joint after which the layers are riveted together and finally sweated by the application of additional solder applied at the edge of the seam. This method not only involved the expense of tinning the edges of the metal but I have found that it cannot be relied upon at all times to produce a perfect pressure tight joint. Due to the adherence to the tinned surfaces of oily or other deleterious matter with which they may come into contact between the time of tinning and the completion of the joint or to imperfect contact between the layers of the metal during the final soldering, the completed joint frequently leaks under pressure test.

The object of my invention is to provide a method of forming a seam or joint which will insure that it be pressure tight and at the same time dispense with the necessity of tinning the overlapping edges of the metal. This I accomplish by forming in one of the overlapping edges a plurality of spaced openings and introducing solder through these openings during the sweating operation in order to insure a solder union of sufficient width and continuous throughout the length of the joint.

As illustrative of an article of manufacture to which my method is applicable, I have chosen a fire extinguisher, reference being had particularly to the joint connecting the edges of the cylindrical body and that connecting the body to the dome-shaped cap.

Figure 1:
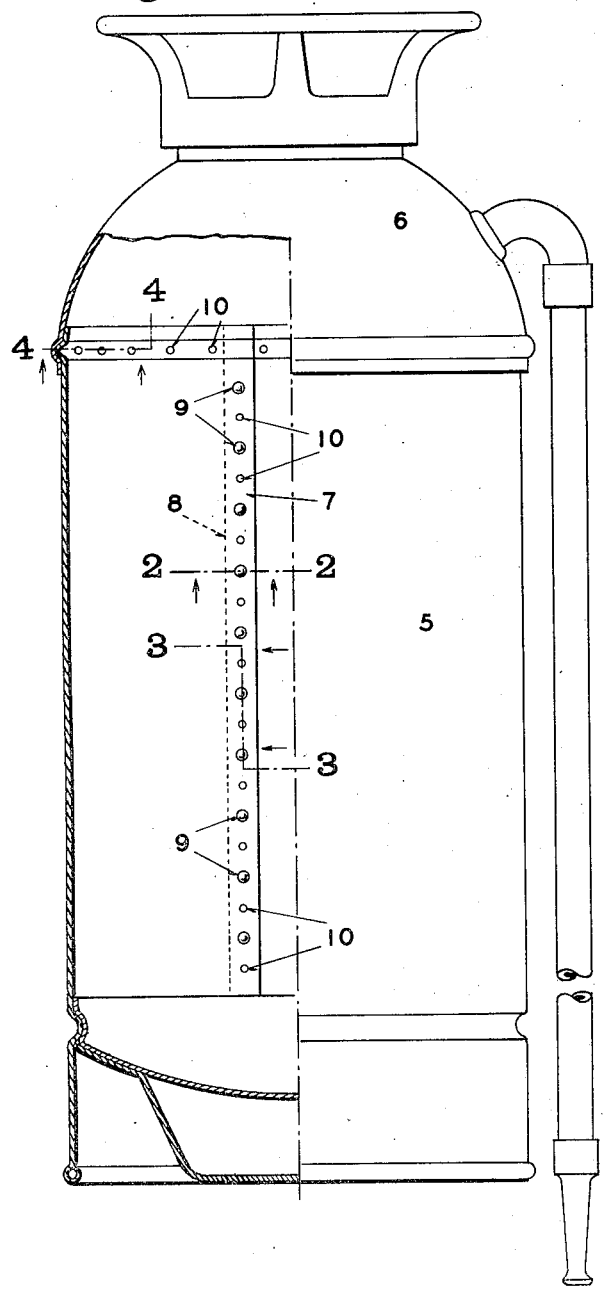
Figure 2:
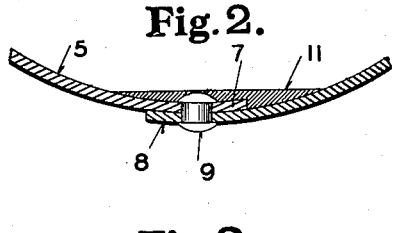
Figure 3:
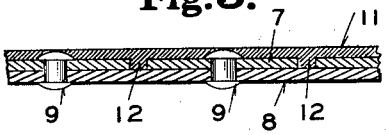
Figure 4:
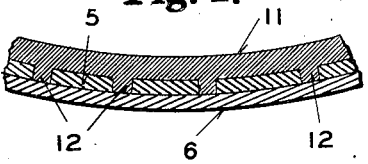

In the accompanying drawings, Figure 1 is a side view partly in section and partly in elevation of the extinguisher before the solder is applied, and Figures 2, 3 and 4 are enlarged sections taken on the lines 2—2, 3—3 and 4—4, respectively, of Figure 1, the solder being shown as applied in these views.

Referring first to the joint of the body 5, the inner edge 7 and the outer edge 8 are overlapped and secured together by spaced rivets 9 in the usual manner, except that the edges are not pre-tinned as this is unnecessary in carrying out my method. Formed in the inner edge 7 are a plurality of spaced holes which are opposed to solid parts of the edge 8 so as to produce supply openings through which solder may be introduced between the layers of the joint. In the drawings I have shown a single hole between each pair of rivets but the number may be increased depending upon the spacing of the rivets.

The container is now placed in a horizontal position with the seam at the bottom and heat applied to raise the joint to the melting point of the solder, which is then applied to the interior of the container. The solder 11 is applied in excess quantity in order to cover the upper face of the layer 7 and enter the supply opening 10, and preferably to rise to the tops of the rivets 9 so that the completed container will present a smooth interior surface. The solder being introduced, not only at the edge of the seam but also at the openings 10, penetration over the entire or substantially the entire overlapping surface is assured and consequently a pressure-tight seam is produced. Further, the solder extending through the openings from the inner face of the layer 8 to the overlaying surplus 11 forms what are in effect solder rivets 12 (Figure 3) supplementary to the rivets 9.

In the joint between the body 5 and the cap 6 the inner, or body edge, and the outer, or cap edge, are held together by their conformation so that the rivets 9 may be dispensed with, the joint being formed solely by the solder between the layers and the solder rivets 12 (Figure 4). The soldering or sweating of this joint is performed in the same manner as the body joint, except that the container is rotated on its axis as the formation of the joint proceeds. This joint is shown as provided with a reinforcing bead and the openings 10 are formed in the beaded portion. While this is not essential the bead provides a convenient trough to contain the excess solder 11.

Having fully described my invention, what

I claim as new and desire to secure by Letters Patent of the United States is:

The method of forming a pressure-tight circumferential joint in a tubular article of manufacture which comprises forming circumferential interlocking beads in the parts to be joined, the inner bead having formed therein a plurality of spaced openings, applying solder to the inner bead while the article is in horizontal position, heating the joint to melt the solder, and rotating the article on its axis to distribute the solder throughout the joint.

In testimony whereof I hereunto affix my signature this 26th day of November, 1929.

CHARLES K. HUTHSING.